July 22, 1952
G. W. DAUGHERTY
2,604,357
SPRAYING MACHINE
Filed Oct. 28, 1947
2 SHEETS—SHEET 1
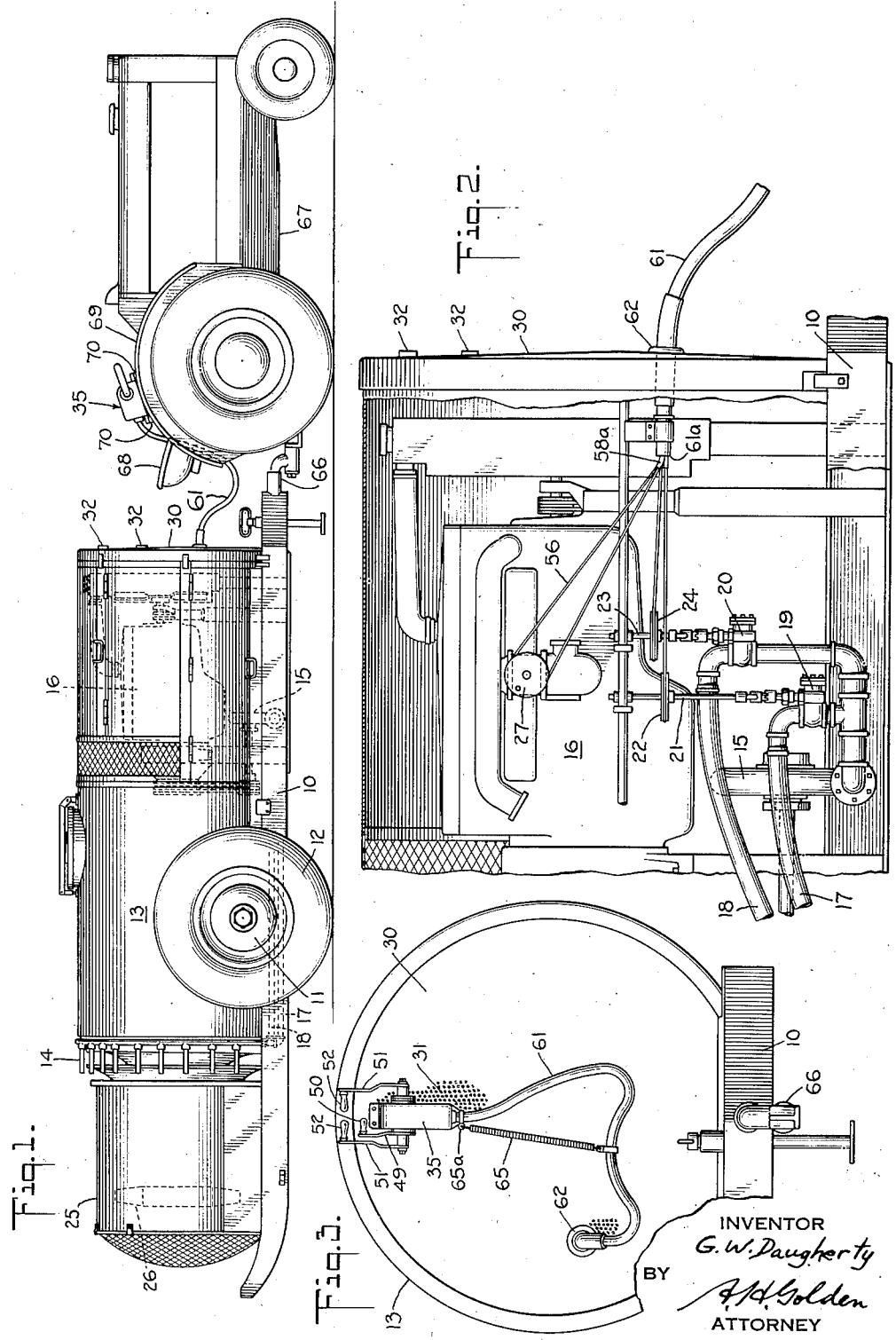
INVENTOR
G. W. Daugherty
BY
H. H. Golden
ATTORNEY

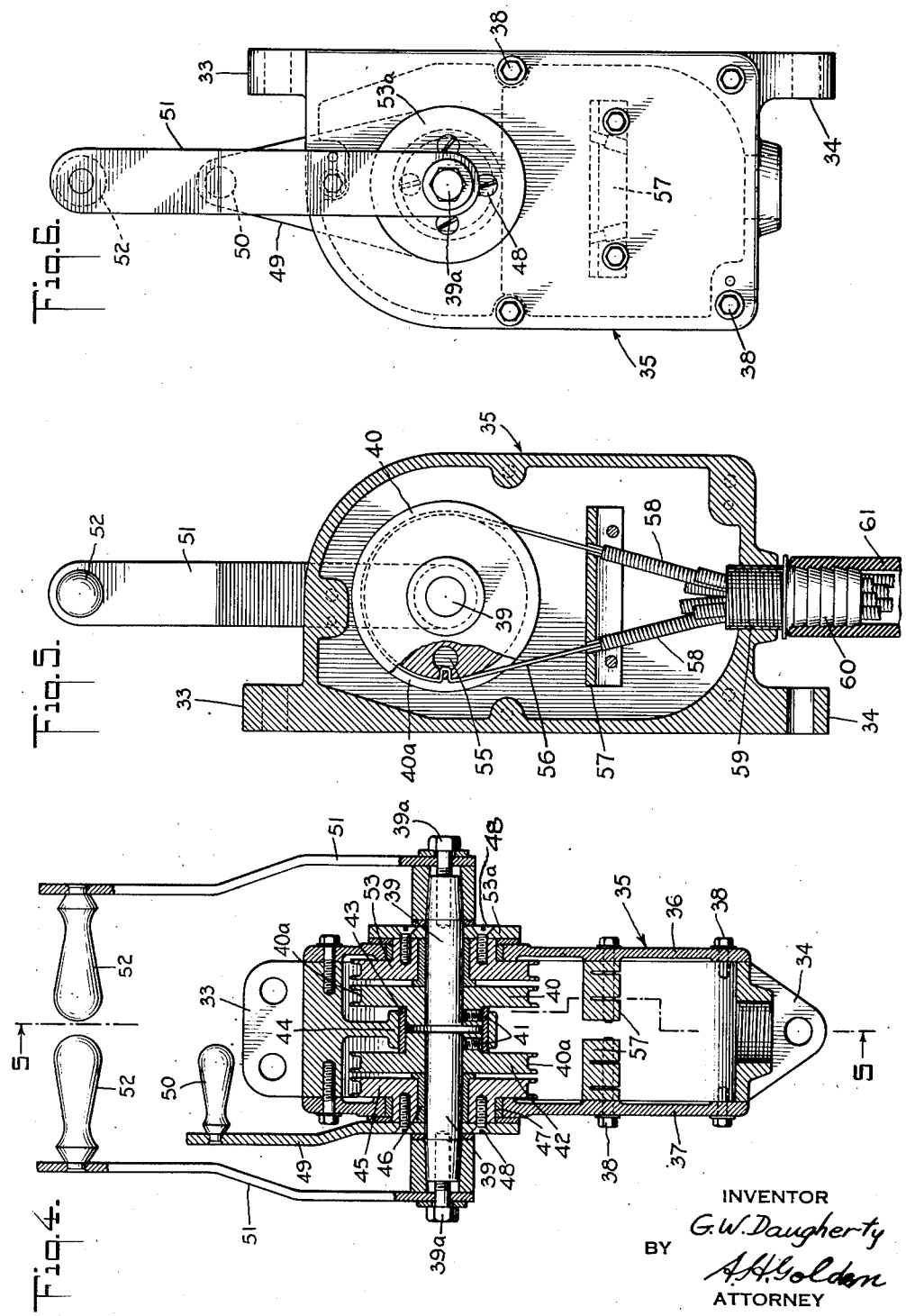

Patented July 22, 1952

2,604,357

UNITED STATES PATENT OFFICE 2,604,357

SPRAYING MACHINE

George W. Daugherty, Orlando, Fla., assignor to Food Machinery and Chemical Corporation, San Jose, Calif., a corporation of Delaware Application October 28, 1947, Serial No. 782,639

1 Claim. (Cl. 299—39)

This invention relates to a spraying and dusting machine of the general type set forth in my Patent No. 2,220,082 and shown also in my Patents Nos. 2,331,107, 2,358,318, and 2,423,008. A relatively late development of my machine is also well set forth in an application for patent filed January 9, 1946, Serial No. 639,949, now Patent No. 2,476,960, and a further application filed September 3, 1947, Serial No. 771,970.

In each of the several machines shown in my earlier patents and applications, there is found a wheeled chassis adapted to be drawn through an orange grove, orchard, or the like, and adapted to apply an insecticide to the trees of the orchard or grove. For the particular purpose, the machine is equipped with an internal combustion engine that drives means for developing an air blast, and a pump for supplying fluid to the air blast to be picked up thereby and to be carried toward the foliage. In certain forms of the machine there may be utilized dust feeding apparatus for moving dust toward the air blast, the dust to be picked up by the air blast and carried to the foliage together with the spray or in place of the spray.

Those skilled in the art will appreciate that controls must be furnished to control the speed of movement of the air blast, the amount of spray material to be supplied, or the particular zone of the air blast to which spray material is to be supplied. Therefore, an examination of my earlier patents will indicate that in my machines I generally arrange to control the speed of the internal combustion engine, and therefore the speed of rotation of the air blast developing means actuated thereby. Also, I generally employ valves to control the amount of spray material that is to be supplied to the air blast, and the points at which the spray material is fed to the air blast.

Considerable difficulty has been found in creating suitable means for facilitating the actuation of the several controls indicated. This is due to the fact that in addition to varying spraying conditions, there is a great deal of variation in the means utilized for moving the spraying machine through the orchard, grove or the like. Thus, some purchasers of the machine may mount it on a large truck for movement through the grove or orchard. Other purchasers may use a truck to pull the machine, while others may use a tractor with the driver seated at the rear of the tractor and just forwardly of the machine. Moreover, because of variations in spraying conditions even within a particular orchard or grove, some owners of my machine will employ one man for moving the machine, as by a tractor or the like, with another man to direct his attention entirely to the operation of the controls. For this type of operation, I developed a machine covered in my Patent No. 2,331,107 listed above, in which there is provided a space within the machine in which an operator may sit and actuate the several controls.

Naturally, in order that my machine may be manufactured economically, it must be mass produced, with all machines of the same construction, and yet adaptable for the individual operations to which I have alluded. The object of the invention of this application is to contribute to the art a control mechanism that will lend itself to use in many ways for convenient and effective operation of the control devices of a machine of the class described.

As a feature of my invention, I utilize a control housing that is preferably connected as by a relatively long flexible hose to the machine and to the control devices thereof. The control housing may be applied to an end wall or a bracket of the machine with the flexible hose then hanging downwardly in the form of a loop. Means are provided within the housing for operating motion transmitting means found in the flexible hose, these motion transmitting means being in turn connected to adjustable control parts of the apparatus of the machine. By mounting the housing on the machine itself, an operator seated on the machine or otherwise in a position accessible to the control housing, may operate control means therein and thereby control the position of the adjustable parts of the apparatus of the machine. By merely removing the control housing from the machine, and then extending the flexible hose to all or part of its length, the control housing may be attached to a tractor, truck, or the like for ready operation by the same operator that is used for driving the tractor or the truck, all as will appear more clearly hereinafter.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claim appended hereto. Those skilled in the art will appreciate that the conception on which my disclosure is based may readily be utilized as a basis for the designing of other structures for carrying out the several purposes of my invention. It is important, therefore, that the claim to be granted me shall be of sufficient breadth to prevent the appropriation of my invention by those skilled in the art.

Referring now to the drawings, Fig. 1 is an elevation of the machine of my invention showing a tractor hitched thereto, and with the control housing on the tractor. Fig. 2 is a view of a part of the machine illustrating three adjustable control devices therein. Fig. 3 is an end view of the forward part of the machine of Fig. 1, showing the control housing removed from the tractor and applied to the machine. Fig. 4 is a vertical section through the control housing. Fig. 5 is a section taken along lines 5—5 of Fig. 4. Fig. 6 is a side view of the control housing.

Referring now more particularly to the drawings, and especially Figs. 1, 2, and 3, reference numeral 10 indicates a chassis used to support my machine, and in turn supported by a pair of wheels 11 carrying tires 12. Positioned centrally of the chassis is a tank 13 containing spraying material that is supplied to a series of spray carrying pipes 14 by a pump 15. Pump 15 is driven by an internal combustion engine 16 through a suitable drive mechanism that is amply shown in my earlier patents and applications. The spray carrying pipes 14 are here shown divided into two groups, one group being supplied by a flexible hose 17 from the pump 15, and the other group by a flexible hose 18 connected to the pump 15, all as well illustrated in Fig. 2. The amount of fluid to be fed through the pipes 17 and 18 is well controlled by valves 19 and 20. Valve 19 is adapted for actuation by a vertically positioned shaft 21 to which is secured a grooved adjusting wheel 22. The valve 20 is actuated by a shaft 23 to which is secured a grooved adjusting wheel 24 of the same general construction as the wheel 22.

At the rear end of my machine, there is positioned what I term an air tunnel 25 within which is mounted an air propeller 26 adapted for rotation by the internal combustion engine 16 as is fully set forth in my earlier applications. Naturally, the speed of rotation of the propeller 26 will depend on the speed of rotation of internal combustion engine 16. The throttle of the internal combustion engine 16 is controlled by a rotating grooved adjusting wheel 27 best seen in Fig. 2. It is now rather obvious that by mere rotation of the three wheels 22, 24, and 27, I can control the volume and strength of the air blast together with the volume and disposition of the spray material supplied to the air blast. My invention resides particularly in the mode of operation of the several adjusting wheels and in the basic concept of the manner in which this may be accomplished to solve the problems that I have already discussed generally in this application.

The forward end wall of my machine is closed by a plate 30, best seen in Figs. 1 and 3, that is preferably perforated as at 31 so that air will flow freely toward the internal combustion engine. Plate 30 has a pair of abutments 32 vertically spaced and suitably threaded for bolts whereby there may be secured thereto the flanges 33 and 34 of a control housing 35. Control housing 35, as best seen in Figs. 4, 5 and 6, may be formed of a base casting integral with the flanges 33 and 34, and open at its sides. The sides may in turn be closed by a side plate 36 and a second side plate 37, both plates held in position by a series of bolts 38. Naturally, the mode of fabrication of the control housing 35 is not of any particular importance.

As best seen in Fig. 4, I mount within the housing 35 a pair of identical shafts 39. Secured to one of the shafts 39 is a grooved disc 40, held to the shaft by a stud 41. The other shaft 39 has similarly secured thereto a grooved disc 42 by means of a similar stud 41. A bearing bushing 43 fits about portions of the discs 41, 42 and forms a bearing relatively to a bored bracket 44 that is an integral part of the casing 35. Mounted about the center of one shaft 39 is a second grooved disc 45 separated from the shaft 39 by a bushing 46, and in turn mounted for rotation on a bushing 47 relatively to the housing 35. Through screws 48, there is secured to the disc 45 a lever 49 carrying a manually operated handle 50. A somewhat similar lever 51 is secured to the end of each shaft 39 by a bolt 39a, and is in turn operated by a handle 52.

The end of the other of the twin shafts 39 carries a disc 53 similar to the disc 45, but the disc 53 is not adapted for operation in the assembly illustrated by me, and is therefore not secured to a lever 49 by the screws 48, but rather to a holding plate 53a. This is due to the fact that I show but three controls for my machine, and therefore require but the three discs 40, 42, and 45 for the operation thereof, as will be made apparent shortly. Naturally, if more controls are to be actuated, I can provide disc 53 with a lever and handle.

In Fig. 5, I illustrate the manner in which the disc 40 has secured thereto at 55 a portion of a cable 56. Cable 56 lies within the groove 40a of the disc 40 and extends at each side of disc 40 into a guide sheath 58 just below a guide bracket 57. Sheaths 58 in turn pass into a sleeve 59 that is secured to housing 35 as by screw threads and extends outwardly of the housing 35 and terminates in a shouldered and ratcheted extension 60. Fitted on this shouldered and ratcheted extension 60 is one end of a flexible hollow member 61 that in actual practice is preferably a reinforced rubber hose. Obviously, this hose will house therein the sheaths 58 in which moves the cable 56. Cable 56 is a continuous cable that extends through the hose 61 and the sheaths 58 into the body of the machine and rearwardly of the plate 30. As seen best in Fig. 2, sheaths 58 may terminate within the machine as at 58a, the cable 56 then extending outwardly of the sheaths and about the grooved adjusting wheel 27. The flexible hose 61 will be secured in some suitable way within a collared guide sleeve 62 carried by the plate 30, and will itself terminate at 61a as is also best seen in Fig. 2.

It is now rather obvious that a simple rotation of one of the levers 51 by its handle 52 will effect a rotation of one of the shafts 39 and one of the discs 40, 42. If disc 40 is rotated, this will actuate cable 56 to rotate the adjusting wheel 27 and thereby change the throttle setting of the internal combustion engine 16. Obviously, the remaining discs within the control housing 35 will actuate the adjusting wheels 22 and 24 through other cables similar to cable 56 and similarly operated thereby for adjusting the amount of spraying material supplied to the air blast and the points of application of the spraying material.

When the control housing 35 is secured to the parts 32 of the plate 30, the hose 61 hangs in a vertical loop as best seen in Fig. 3, the loop being supported by a spring 65 extending between a part 65a of the casing 35 and the lower portion of the hose 61, as is clearly apparent. It is now clear that with the control housing so positioned, any one standing at the forward part of the machine may operate the control parts of the machine with considerable ease.

Referring now back again to Fig. 1, the forward part of the chassis 10 is equipped with a hitch 66 of the type shown and claimed in my application Serial No. 618,618, allowed on September 12, 1947, now Patent No. 2,436,556. Through this hitch the machine is adapted to be pulled by a tractor 67 equipped with a seat 68 on which sits the operator of the tractor. One of the fenders 69 of the tractor is equipped with suitable brackets 70, and by a simple removal of three bolts, the control housing 35 may be removed from the brackets 32 of the machine and secured to the brackets 70. As a matter of fact, the control housing 35 may very well be secured in position on the machine through means such as a bayonet joint, and may therefore be similarly secured to any desired part of the tractor. The flexible hose 61 is of sufficient length so that various types of tractors or even trucks may be used while allowing the control housing to be placed in convenient operating relation to the operator. With the parts related as in Fig. 1, it is obvious that the operator seated on seat 68 will be in a position to move the several handles 50, 52 and thereby position the three adjusting wheels of the apparatus of my machine as may be found necessary.

I believe that the simple and effective manner in which I have solved a long-standing problem that has confronted this art will now be apparent to those skilled in the art.

I now claim:

In a spraying and dusting machine of the class described, a wheeled chassis, a hitch whereby said chassis may be pulled by a tractor, mechanical apparatus mounted on said chassis including an internal combustion engine and a pump and spraying apparatus, adjustable parts forming part of said mechanical apparatus, a control housing, a plurality of manually operated means mounted on said housing for movement of adjustment, a flexible hollow member extending between said housing and said wheeled chassis, motion transmitting means in said flexible hollow member extending between the adjustable parts of said mechanical apparatus and said manually operated means mounted on said housing whereby said manually operated means may be operated to control said mechanical apparatus, means removably supporting said housing on said wheeled chassis, said flexible member then lying in a loop extending between said control housing and said chassis, said control housing being removable from said wheeled chassis for mounting on a tractor secured by said hitch to said wheeled chassis with said flexible hollow member then extending from said tractor across an open space to said chassis and with said motion transmitting means extending to said mechanical apparatus.

GEORGE W. DAUGHERTY.

REFERENCES CITED

The following references are of record in the file of this patent:

UNITED STATES PATENTS

| Number | Name | Date |
|---|---|---|
| 1,233,898 | Miller | July 17, 1917 |
| 1,433,688 | Stahl | Oct. 31, 1922 |
| 1,793,786 | Emmons, III | Feb. 24, 1931 |
| 2,140,109 | Keller | Dec. 13, 1938 |
| 2,193,893 | Van Vleck | Mar. 19, 1940 |
| 2,226,192 | Barrett | Dec. 24, 1940 |
| 2,235,175 | Simpkins et al. | Mar. 18, 1941 |
| 2,254,083 | Nickles et al. | Aug. 26, 1941 |